(12) United States Patent
Tsai et al.

(10) Patent No.: US 8,924,599 B2
(45) Date of Patent: Dec. 30, 2014

(54) ELECTRONIC DEVICE AND METHOD OF SIGNAL TRANSMISSION THEREIN

(71) Applicants: Irene Tsai, New Taipei (TW); Yi-Fen Chou, Keelung (TW)

(72) Inventors: Irene Tsai, New Taipei (TW); Yi-Fen Chou, Keelung (TW)

( * ) Notice: Subject to any disclaimer, the term of this patent is extended or adjusted under 35 U.S.C. 154(b) by 46 days.

(21) Appl. No.: 13/755,736

(22) Filed: Jan. 31, 2013

(65) Prior Publication Data
US 2013/0262712 A1 Oct. 3, 2013

(30) Foreign Application Priority Data

Mar. 29, 2012 (TW) .............................. 101111117 A

(51) Int. Cl.
*G06F 3/00* (2006.01)
*G06F 13/00* (2006.01)
*G05B 19/05* (2006.01)
*G06F 13/20* (2006.01)
*G06Q 20/34* (2012.01)

(52) U.S. Cl.
CPC .............. *G05B 19/054* (2013.01); *G06F 13/20* (2013.01); *G06Q 20/353* (2013.01)
USPC ............. 710/12; 710/303; 707/736; 709/213; 709/217

(58) Field of Classification Search
None
See application file for complete search history.

(56) References Cited

U.S. PATENT DOCUMENTS

| 6,760,605 | B1 | 7/2004 | Vannel et al. | |
|---|---|---|---|---|
| 2001/0032266 | A1* | 10/2001 | Minowa | 709/229 |
| 2005/0096988 | A1* | 5/2005 | Yanagisawa et al. | 705/16 |
| 2005/0220152 | A1* | 10/2005 | Horvath et al. | 370/522 |
| 2009/0060219 | A1* | 3/2009 | Inohara | 381/77 |
| 2012/0036220 | A1* | 2/2012 | Dare et al. | 709/217 |

FOREIGN PATENT DOCUMENTS

EP 2251986 11/2010

OTHER PUBLICATIONS

European Search Report, Application No. EP 13161675, Jul. 9, 2013, The Hague.

* cited by examiner

*Primary Examiner* — Michael Sun
(74) *Attorney, Agent, or Firm* — SmithAmundsen LLC; Kelly J. Smith; Dennis S. Schell

(57) ABSTRACT

A method of signal transmission is to be implemented by a control module of an electronic device. The control module includes a first input/output (I/O) port to be coupled to an input module, a second I/O port to be coupled to an output module, and a control unit. In the method, the control unit is configured to electrically interconnect the first I/O port and the second I/O port such that the input module is able to communicate with the output module, or to open a specific channel and to temporarily stop transmission within other channels, based on a signal or instruction received from the input module.

23 Claims, 7 Drawing Sheets

ELECTRONIC DEVICE AND METHOD OF SIGNAL TRANSMISSION THEREIN

CROSS-REFERENCE TO RELATED APPLICATION

This application claims priority of Taiwanese Application No. 101111117, filed on Mar. 29, 2012.

BACKGROUND OF THE INVENTION

1. Field of the Invention

The invention relates to a signal transmission method, more particularly to a signal transmission method that is suitable for use on a mobile device, a portable reader, a POS machine having a Java card-based design, or the like.

2. Description of the Related Art

FIG. 1 illustrates circuitry of a conventional mobile device 900. The mobile device 900 includes a baseband module 910, and an electronic card slot 920 that is coupled to the baseband module 910. The electronic card slot 920 is typically for receiving a subscriber identity module (SIM) card therein so as to electrically connect the SIM card and the baseband module 910 for communicating with the baseband module 910.

In order to accommodate a growing need for frequent use of commercial applications (e.g., online transaction) that require a high security level on the mobile device 900, another identification mechanism is needed (e.g., a bankcard, another SIM from a separate mobile telephony service provider, etc.). Conventionally, such identification mechanism is implemented in the operating system of the mobile device 900 using software. Nonetheless, the software-based identification mechanism may face safety threat from malicious programs (e.g., a Trojan horse), and as a result, a hardware-based identification mechanism is more preferable. However, the hardware-based identification mechanism is an external device (e.g., an electronic card) that must be physically connected to the mobile device 900, such that an additional expansion slot may be required. Since the electronic card slot 920 is only configured to communicate with the baseband module 910, and the identification mechanism may need to communicate with other modules in the mobile device 900, using the electronic card slot 920 to receive the hardware-based identification mechanism may be insufficient to fulfill such needs.

A number of solutions have been provided to address this problem. For example, a secure digital (SD) card slot 930 and/or a universal serial bus (USB) port 940 can be used to receive such hardware-based identification mechanism. But such solution may not be preferable due to the fact that the communication specification used by the hardware-based identification mechanism (i.e., International Organization for Standardization (ISO) 7816 specification) may not conform with that used by the SD card slot 930 and the USB port 940, and that some mobile devices 900 (e.g., iPhone) do not have the SD card slot 930 and the USB port 940.

Another solution involves implementing the hardware-based identification mechanism onto a thin film that can be attached to the SIM card. But the thickness of the thin film that adds to the attached SIM card renders the SIM card difficult to be received by the electronic card slot 920, sometimes even requiring a hole be drilled in the SIM card in order to fit in the electronic card slot 920.

SUMMARY OF THE INVENTION

Therefore, one object of the present invention is to provide a method of signal transmission that can fulfill the need for the additional expansion slot without encountering the above-mentioned drawbacks. Specifically, the method can be implemented by a signal transmission machine that is a Java-based virtual machine having multiple input/output (I/O) ports.

Accordingly, a method of signal transmission of the present invention is configured to be implemented by a control module of an electronic device. The control module includes a first I/O port to be coupled to an input module, a second I/O port to be coupled to an output module, and a control unit. The method comprises the following steps of:

when a flag of an input signal received from the input module using the first I/O port conforms with a corresponding flag in the control module, configuring the control unit to electrically interconnect the first I/O port and the second I/O port such that the input module is able to communicate with the output module; and configuring the control unit to open a specific channel and to temporarily stop transmission within other channels when a multi-channel management instruction indicating the specific channel is received from the input module via the first I/O port.

Another object of the present invention is to provide an electronic device including a control module that is capable of implementing the aforementioned method.

Accordingly, an electronic device of the present invention comprises an input module for receiving signals, an output module and a control module.

The control module includes first and second input/output (I/O) ports, a control unit and a storage unit.

The first and second I/O ports are coupled to the input module and the output module, respectively. The control unit is coupled to the first and second I/O ports. The storage unit is coupled to the control unit and has at least one executable program stored therein.

The control unit is configured to electrically interconnect the first I/O port and the second I/O port such that the input module is able to communicate with the output module, when a flag of an input signal received from the input module using the first I/O port conforms with a corresponding flag in the at least one executable program.

The control unit is further configured to open a specific channel and to temporarily stop transmission within other channels when a multi-channel management instruction indicating the specific channel is received from the input module via the first I/O port.

In some embodiments, the control module can be an individual electronic card.

Yet another object of the present invention is to provide a method for displaying a signal of a transaction by a device.

Accordingly, a method for displaying a signal of a transaction of the present invention is implemented by a device that is operable to communicate with a contact-less point of sale (POS) host.

The device includes a control unit and a storage unit coupled to the control unit and having at least one executable program stored therein. The method comprises the following steps of:

configuring the device to receive an input signal from the POS host;

configuring the control unit to store the input signal in the storage unit; and configuring the control unit that executes the least one executable program to process the input signal, and to generate a display screen according to the processed input signal.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
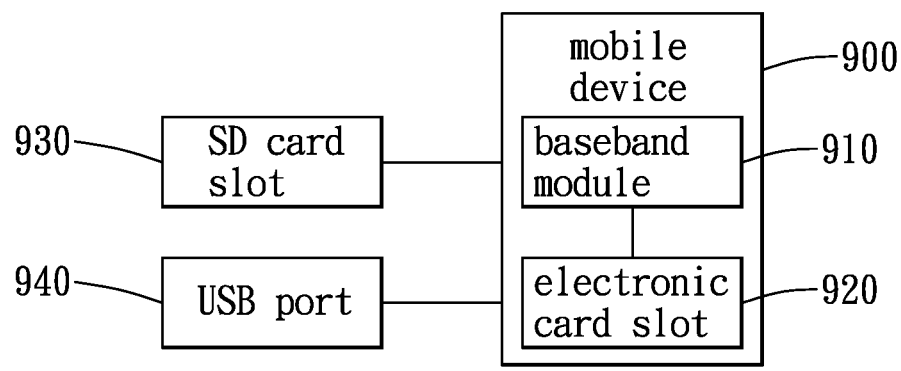
FIG. 1 is a schematic block diagram of a conventional mobile device.
Figure 2:
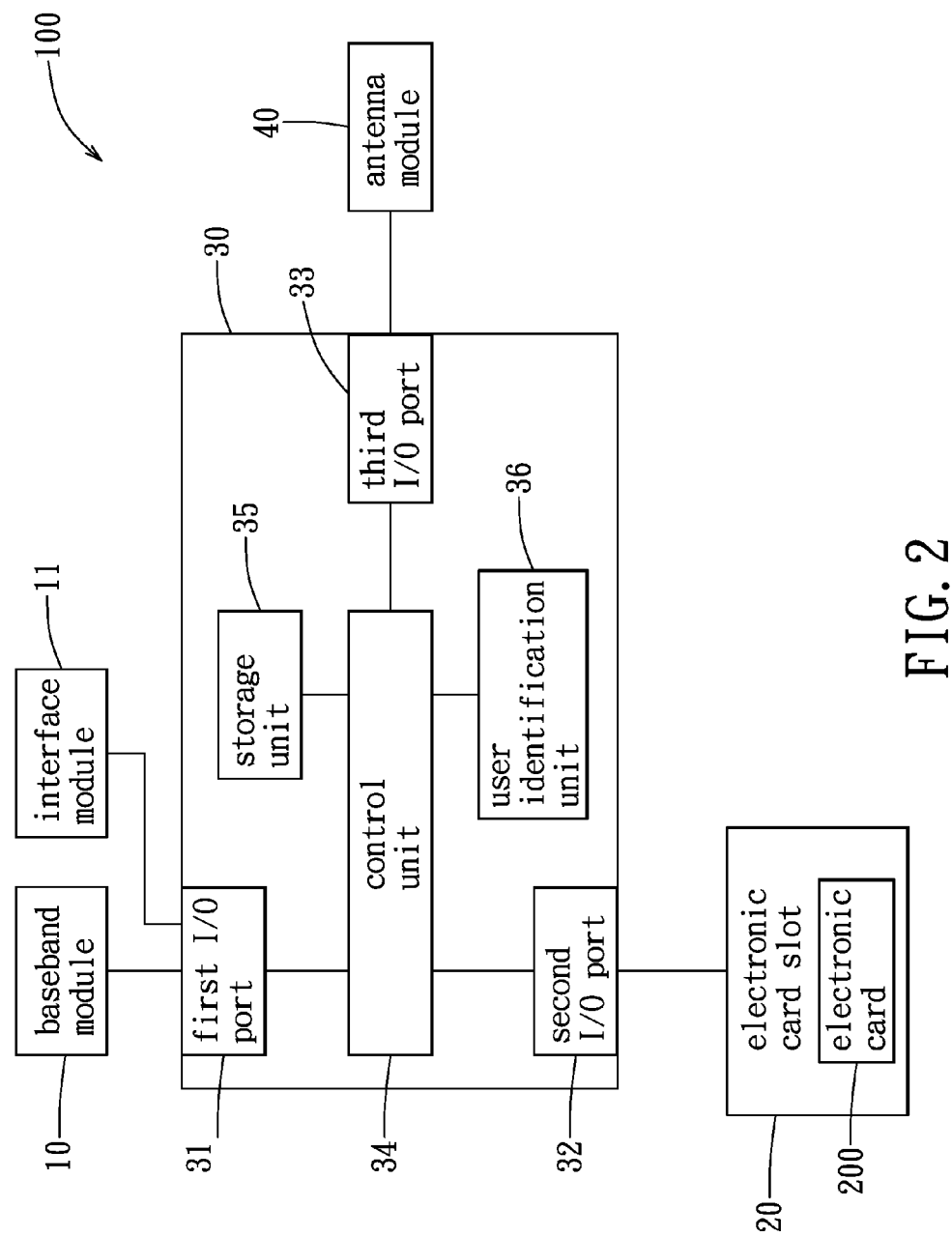
FIG. 2 is a schematic block diagram of a preferred embodiment of an electronic device according to the invention.

As shown in FIG. 2, the preferred embodiment of an electronic device 100 according to the present invention is a device that is configured to access mobile telephony services via a subscriber identity module (SIM), such as a cell phone and/or a personal digital assistant (PDA). In this embodiment, the electronic device 100 is a mobile device, and comprises an input module, an output module, a control module 30, and an antenna module 40. The input module includes a baseband module 10 that supports the International Organization for Standardization (ISO) 7816 specification. The output module includes an electronic card slot 20 to be connected to an electronic card 200, and the electronic card 200 can be a SIM card, a credit card or bank card that has an Europay, MasterCard or Visa (EMV) chip. In other examples, the output module may be one of an electronic card, and a device that supports International Organization for Standardization (ISO) 7816 specification. The input module may be one of an antenna module 40 and a device that supports ISO 7816/Universal Asynchronous Receiver/Transmitter (UART) specification, and that has a structure similar to that of the baseband module 10. In some examples, the input module further includes an interface module 11, such as a card reader, that supports ISO 7816/UART specification.

Figure 3:
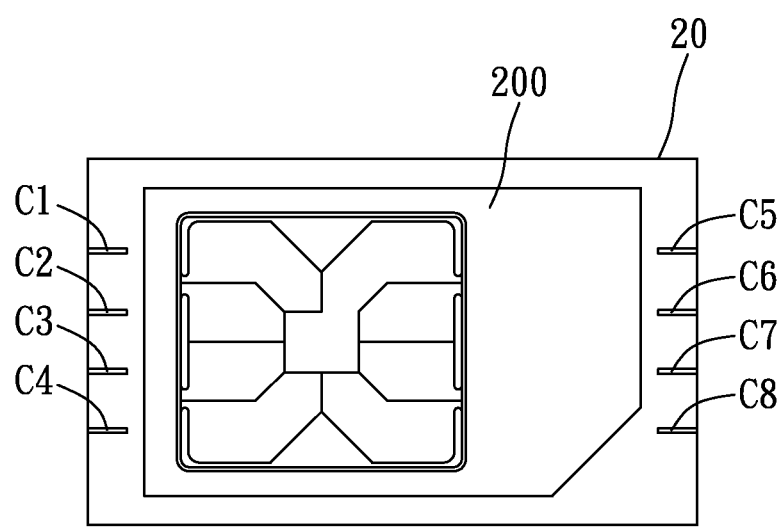
FIG. 3 is a schematic view of pin connections between an electronic card and an electronic card slot of the electronic device.

Further referring to FIG. 3, in this embodiment, the electronic card slot 20 includes eight pins C1-C8 for connecting electrically to the electronic card 200. The respective functionalities of the pins are as follows: C1 is a power pin, C2 is a reset pin, C3 is a clock signal pin, C5 is a ground pin, C6 is an internal programming voltage pin, C7 is a signal input/output (I/O) pin, and each of C9 and C8 is a reserve pin which may be in a floating state. In some examples where the electronic device 100 does not have the required number of pins to accommodate C4 and C8 (such as iPhone 5), the pins C4 and C8 can be omitted.

The control module 30 is connected electrically to the baseband module 10 and the electronic card slot 20. In this embodiment, the control module 30 is an integrated circuit (IC) application chip having a Java card-based design, and is implemented with the baseband module 30 onto a single IC chip. In some examples, the control module 30 is an individual electronic card detachably connected to the electronic device 100. The effect of using the Java card-based design structure for the control module 30 is that the control module 30 can be operable to process applications that are compatible with the Java card-based design structure (e.g., applications related to EMV, People's bank of China (PBOC), certificate authority (CA), and public key infrastructure (PKI)), and that the Java card-based design structure enables over-the-air (OTA) configuration, such that the operating system, applications and information stored in the control module 30 may be updated and maintained conveniently.

The control module 30 includes a first input/output (I/O) port 31 coupled to the baseband module 10 and the interface module 11, a second I/O port 32 coupled to the electronic card slot 20, a third unit I/O port 33 connected electrically to the antenna module 40, a control unit 34 coupled to the first, second and third I/O ports 31, 32 and 33, a storage unit 35 coupled to the control unit 34 and having at least one executable program stored therein, and a user identification unit 36 coupled to the control unit 34.

The first I/O port 31 is operable to communicate with the baseband module 10 using ISO7816 specification. The second I/O port 32 is operable to communicate with the electronic card 200 via the electronic card slot 20. The third I/O port 32 is operable to communicate with the antenna module 40.

The executable program that the storage unit 35 stores therein is a Java Applet program and/or a SIM application toolkit (STK), and can be obtained using over-the-air (OTA) configuration. The user identification unit 36 is for storing personal information that is stored in the SIM card. In some examples, the personal information includes bank card security personal identity information.

The control module 30 is operable to work in a number of different transmission modes, based on a baseband signal received via the baseband module 10 and the first I/O port 31. For example, the control unit 34 is configured to operate in a first transmission mode, in which the first I/O port 31 and the second I/O port 32 are electrically interconnected, such that, the baseband module 10 is able to communicate with the electronic card 200, which is connected to the electronic card slot 20. The control unit 34 is further configured to operate in a second transmission mode, such that the control unit 34 that executes the at least one executable program stored in the storage unit 35 is able to communicate with the electronic card 200 that is connected to the electronic card slot 20. In other transmission modes, the baseband module 10 is able to communicate with the storage unit 35 and the user identification unit 36 via the first I/O port 31 and the control unit 34. The user identification unit 36 is able to communicate with the electronic card 200 that is connected to the electronic card slot 20 via the control unit 34 and the second I/O port 32. The user identification unit 36 is further able to communicate with the storage unit 35 via the control unit 34, and to communicate with the antenna module 40 via the control unit 34 and the third I/O port 33. In brief, using the first, second and third I/O ports 31, 32 and 33, the control unit 34 of the control module 30 is operable to open a specific channel within the control module 30 so as to enable two of the baseband module 10, the electronic card 200, the storage unit 35, the user identification unit 36 and the antenna module 40 to communicate with each other, based on the baseband signal.

Figure 4:
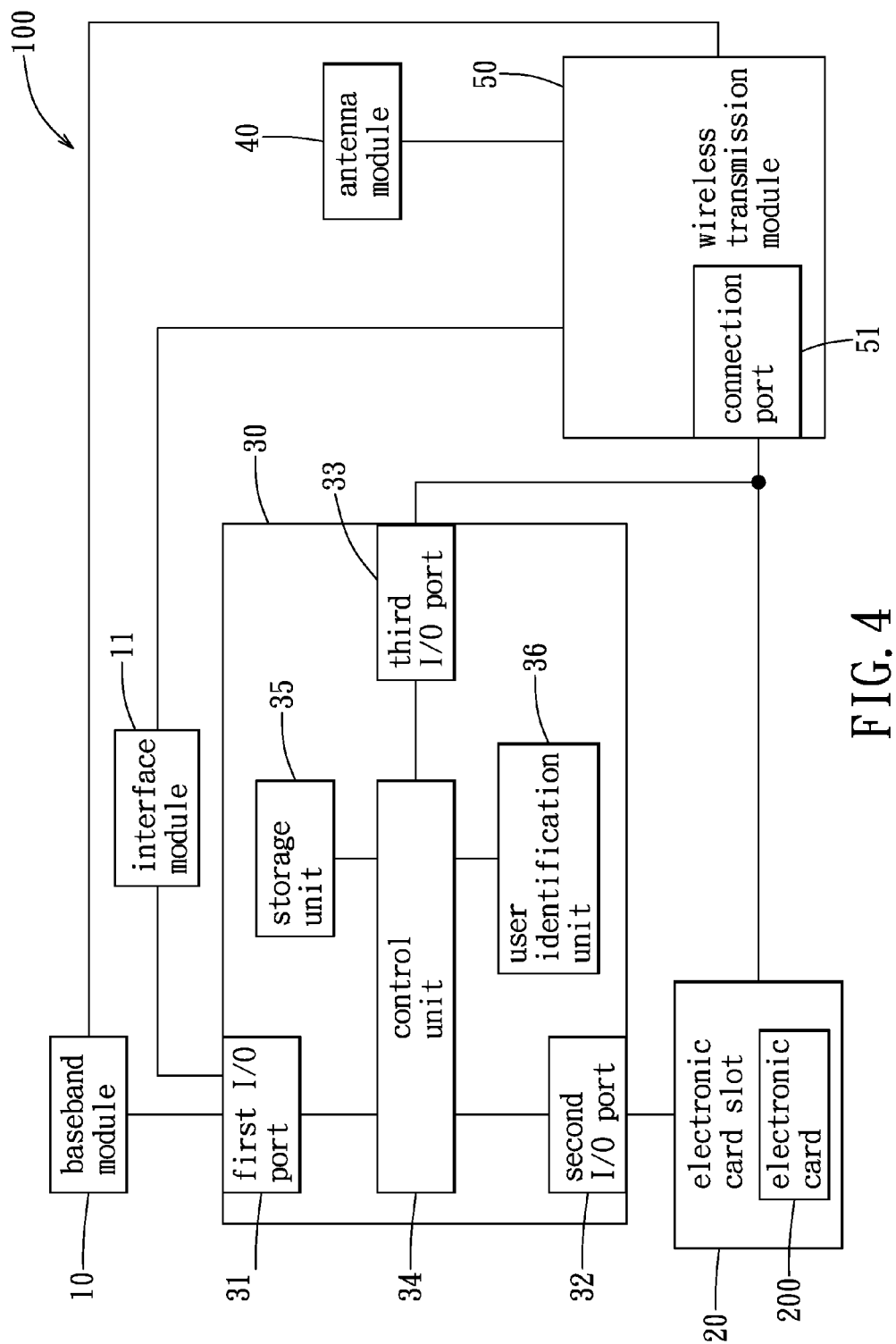
FIG. 4 is a schematic block diagram of the electronic device of FIG. 2, according to another aspect.

According to another aspect, the electronic device 100 may further comprise a wireless transmission module 50 coupled to the electronic card slot 20, the third I/O port 33 and the baseband module 10, as best shown in FIG. 4. The antenna module 40 is coupled to the wireless transmission module 50 (see FIG. 4). The wireless transmission module 50 is configured to support near field communication (NFC) technology, and has a connection port 51 for electrically connecting to the third I/O port 33. It is noted that, the third I/O port 33 and the connection port 51 are coupled using one of soldering, a circuit connected therebetween, a multiplexer that can switch the connection port 51 to be connected to one of the electronic card slot 20 and the third I/O port 33, etc. As a result, the electronic card 200 that is connected to the electronic card slot 20 is operable to communicate with the antenna module 40 and the wireless transmission module 50. Using the mechanism as described above, communication is enabled between the antenna module 40 and the wireless transmission module 50 with one of the control unit 34, the storage unit 35 and the user identification unit 36. The wireless transmission module 50 may be configured to further support other communication protocols, such as single wire protocol (SGP) specification, sigin-sigout connection (S2C) interface and ISO14443 specification.

In addition to the above mentioned transmission function, the control module 30 of this invention is configured such that functionality of the SIM card can be provided by a mobile telephony service provider using OTA configuration or integrating into the user identification unit 36 of the control module 30. Therefore, the control module 30 serves the effect of the SIM card, and the electronic card slot 20 is left available to be connected electrically to other card modules. It is noted that, in other examples, the electronic device 100 further comprises a secure digital (SD) card slot (not shown), and the control module 30 may include a fourth I/O port (not shown) electrically connected to the SD card slot. As a result, the SD card slot is also available to be connected electrically to other card modules.

Figure 5:
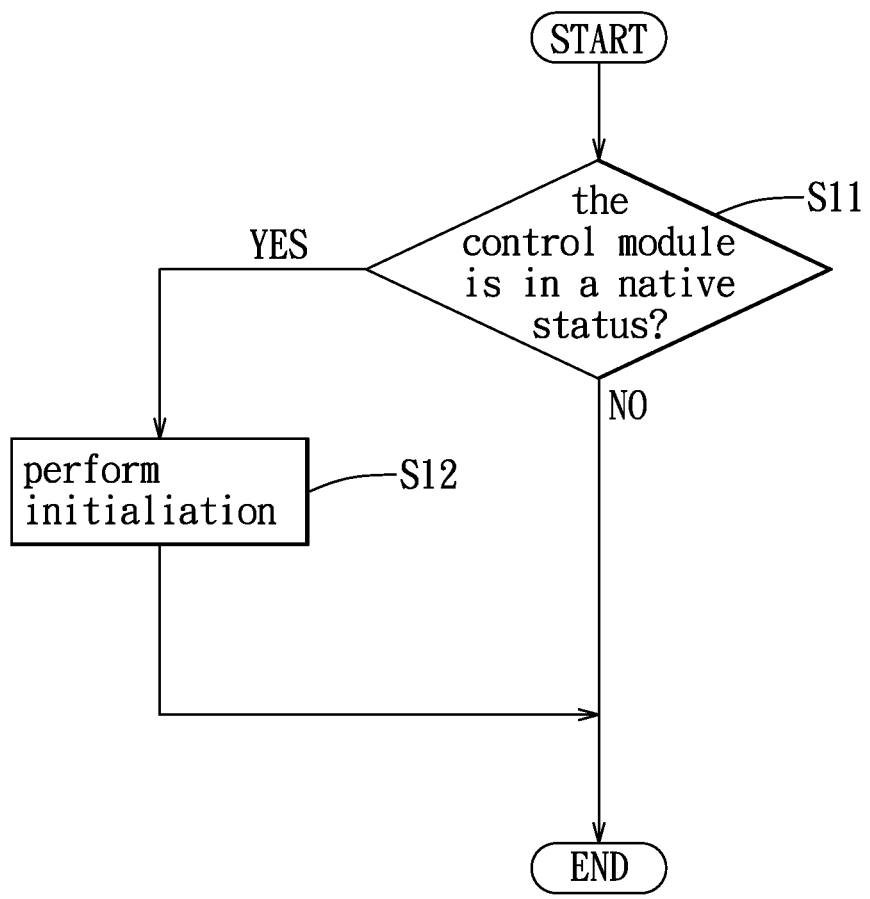
FIG. 5 is a flowchart of an initialization procedure performed on the control module of the electronic device.

In order to achieve the Java card effect, an initialization procedure as shown in FIG. 5 must be performed on the control module 30 of the electronic device 100. In the initialization procedure, it is first determined in step S11 whether the control module 30 is in a native status (i.e., the control module 30 is a native card) using, for example, a card reader or the like. When the determination made in step S11 is affirmative, the initialization is performed on the control module 30 in step S12, in which specific operating system (OS) and card-management program are installed into the control module 30. In this example, a Java card virtual machine OS, along with a plurality of applications (e.g., mobile banking token, gaming user authorization and coupon for coffee), can be installed into the control module 30 for display on a screen (not shown) of the electronic device 100. Otherwise, the control module 30 already has OS and applications installed, and needs no initialization. The procedure is then terminated.

Afterward, when the electronic card 200 is inserted into the electronic card slot 20, the control module 30 enables the electronic card 200 to communicate with the program stored in the storage unit 35. The following paragraphs are directed to a method of signal transmission to be implemented by the control module 30. In the following example, the electronic card 200 is a bankcard, and a plurality of JAVA Applet programs, including a bank JAVA Applet related to a commercial transaction using the bankcard, are stored in the storage unit 35.

Figure 6A:
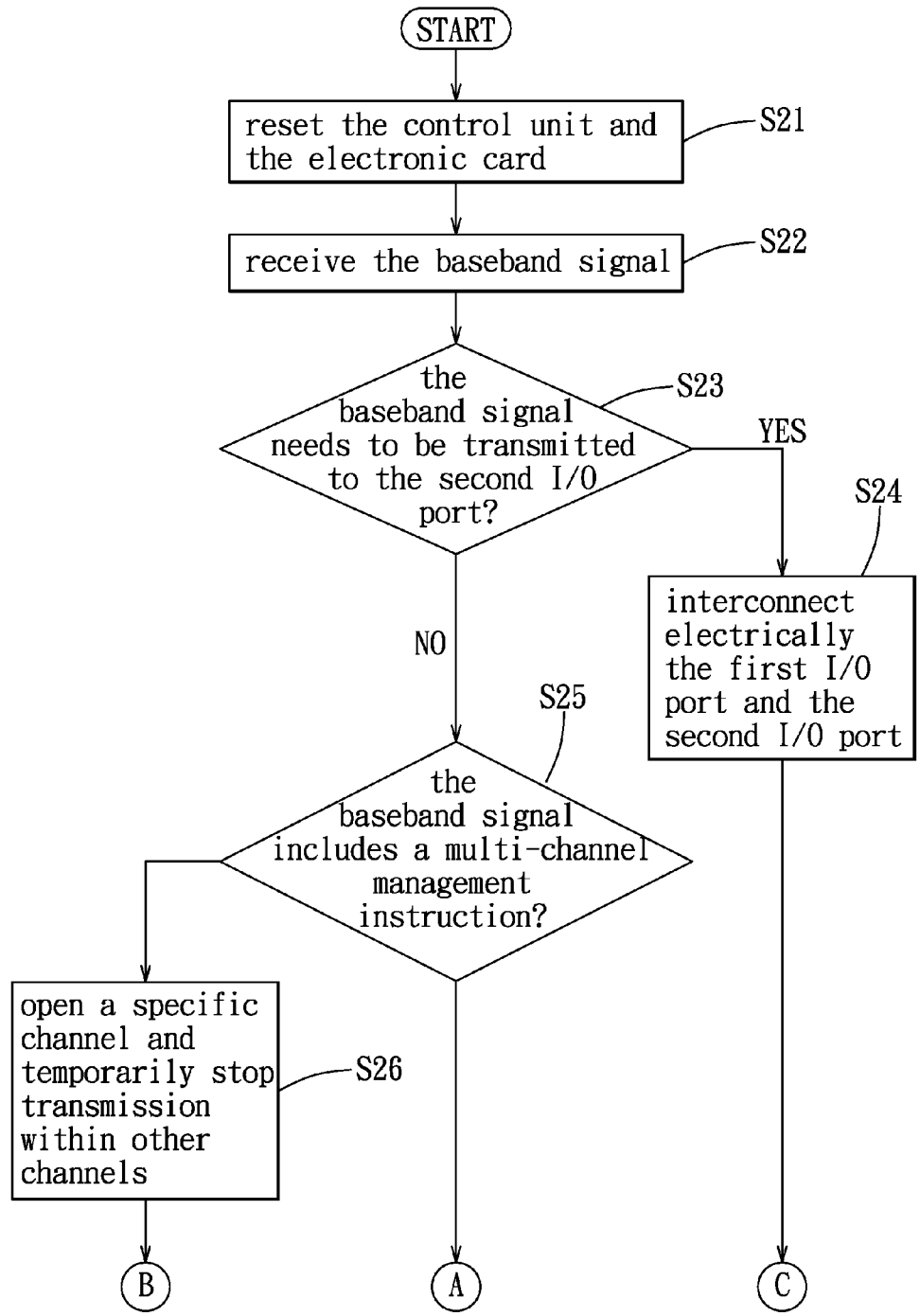
FIGS. 6A and 6B are a flowchart of a method of signal transmission implemented by the control module of the electronic device of the present invention.
Figure 6B:
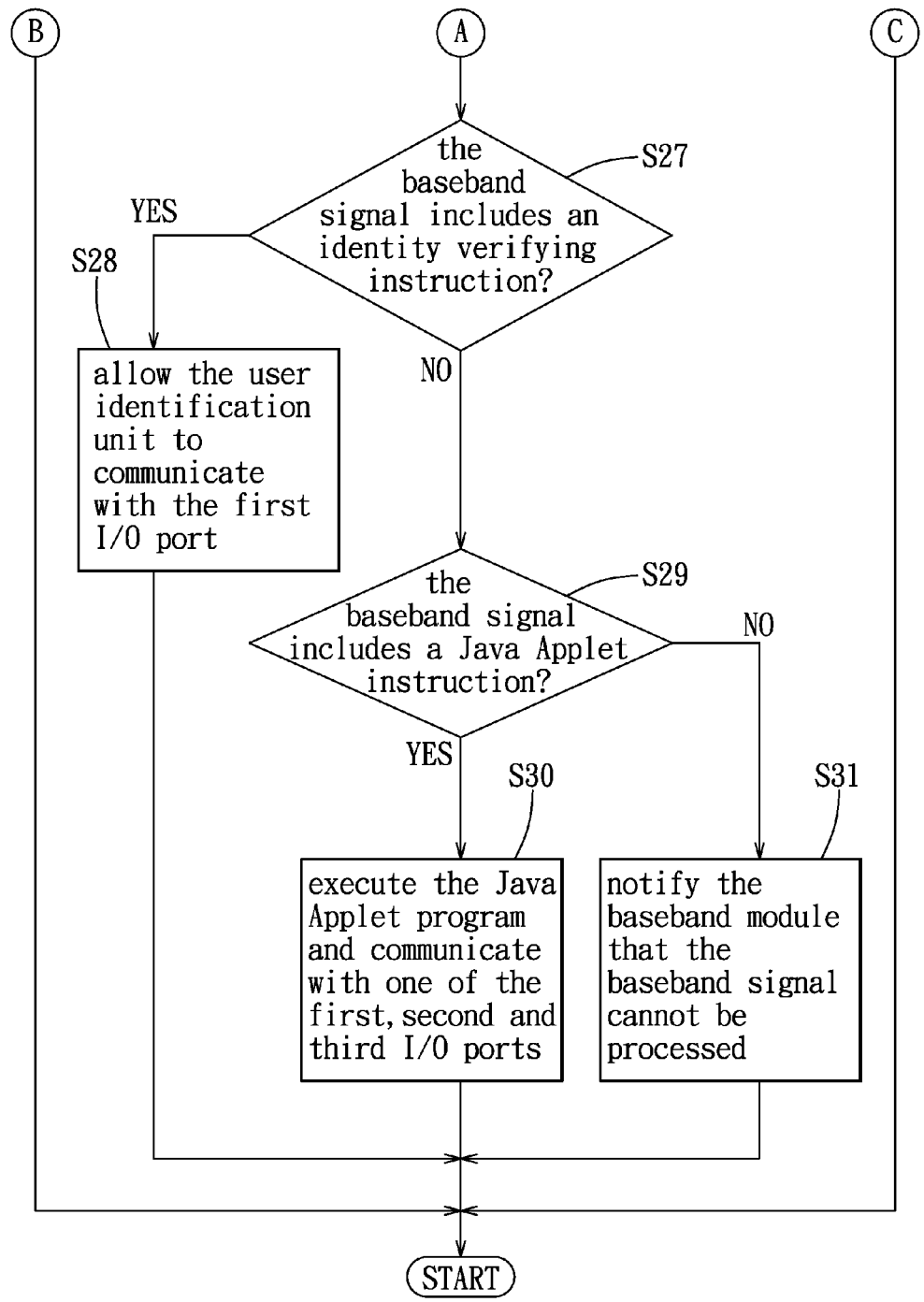

Referring to FIGS. 6A and 6B, in step S21, when the electronic device 100 is activated, the baseband module 10 is operable to send a reset signal to the control module 30 and the electronic card slot 20. Accordingly, the control unit 34 of the control module 30 and the electronic card 200 that is connected to the electronic card slot 20 are reset. It is noted that, there are two different modes to reset the control module 30 and the electronic card 200. One involves resetting the control module 30, and configuring the control module 30 to reset the electronic card 200. The other one involves directly resetting both the control module 30 and the electronic card 200.

In step S22, the control module 30 is operable to receive the baseband signal from the baseband module 10 using the first I/O port 31. Then, the control unit 39 is operable in step S23 to determine, using a flag of the baseband signal, whether the baseband signal needs to be transmitted to the second I/O port 32. When the flag of the baseband signal received from the baseband module 10 using the first I/O port 31 conforms with a corresponding flag in the control unit 34, it is determined the baseband signal needs to be transmitted to the second I/O port 32, and the control unit 34 is operable to operate in the first transmission mode for interconnecting electrically the first I/O port 31 and the second I/O port 32 in step S24. In this example, the affirmative determination means that the baseband signal is associated with the electronic card 200 connected to the electronic card slot 20, and that a channel between the baseband module 10 and the electronic card 200 must be opened. The method is then terminated. Otherwise, the flow proceeds to step S25.

In step S25, the control unit 34 is operable to determine whether the baseband signal received from the baseband module 10 via the first I/O port 31 includes a multi-channel management instruction. The multi-channel management instruction indicates a specific channel directing to one of the programs stored in the storage unit 35. When the determination made in step S25 is affirmative, the control unit 34 is operable to open the specific channel and to temporarily stop transmission within other channels in step S26. In this example, the control unit 34 opens the channel directed to the bank Java Applet, and is operable to store unsaved data of stopped channels in a memory cache (not shown) of the control module 30. The method is then terminated. Otherwise, the flow proceeds to step 327.

In step 327, the control unit 34 is operable to determine whether the baseband signal includes a identity verifying instruction. The identity verifying instruction is generally associated with the identification of a user of the electronic device 100, such as a global system for mobile communications (GSM) instruction, a code division multiple access (CDMA) instruction, and a wideband code division multiple access (W-CDMA) instruction. When the determination made in step S27 is affirmative, the control unit 34 is operable to allow the user identification unit 36 to communicate with the first I/O port 31 in step S28. Accordingly, the user identification unit 36 is operable to communicate with the baseband module 10. The method is then terminated. Otherwise, the flow proceeds to step S29.

In step S29, the control unit 34 is operable to determine whether the baseband signal includes a Java Applet instruction. The Java Applet instruction is related to the Java Applet programs stored in the storage module 35. When the determination made in step S29 is affirmative, the control unit 34 is operable to execute the Java Applet program and to communicate with one of the first, second and third I/O ports 31, 32 and 33 in step S30. As a result, one of the baseband module 10 and the electronic card 200 and the antenna module 40 is able to communicate with the Java Applet program. The method is then terminated. Otherwise, the flow proceeds to step S31.

In step S31, the control unit 34 notifies the baseband module 10 that the baseband signal (e.g., a JAVA card runtime environment (JCRE) instruction, or other testing instruction) cannot be processed by the control module 30, and needs to be processed by other modules of the electronic device 100. In this example, the control unit 34 transmits the baseband signal back to the baseband module 10, while in other examples, the baseband signal can be transmitted to other modules of the electronic device 100, the electronic card 200 or the other I/O ports. It is noted that in steps S30 and S31, the operations are executed in specific circuit blocks (not shown) in a JCRE layer of the control module 30.

It is noted that, in the above example, the control module 30 continuously receives baseband signals from the baseband module 10, and the control unit 34 processes one of the baseband signals at a time. After one of the baseband signals is processed, the method is terminated and the flow returns to step S22 to receive another one of the baseband signals. In other examples, after one of the baseband signals is processed, the flow may return immediately to step S22.

In brief, in the signal transmission method, the control unit 34 is operable to allow different parts of the control module 30 to communicate with the baseband module 10 and/or the electronic card 200 based on the received baseband signal, and to transmit the baseband signal that is deemed not processable to an appropriate circuit block. In other examples, the electronic card 200 can be an electronic ID card issued by a governmental institution or a USIM card provided by a mobile telephony service provider, and the above method is also suitable for performing the corresponding signal transmission function.

In some examples, when the extra hardware-based identification mechanism is not required (e.g., a username/password combination may suffice), the electronic card slot 20 may receive the SIM card, and the identification mechanism can be implemented by the control module 30, in a similar manner as described above.

Due to the fact that the SIM card function can be provided from more than one signal functional block (i.e., the electronic card 200 connected to the electronic card slot 20 and the control module 30), it is possible for a user to switch between the functional blocks for providing the SIM card function. For example, the user is allowed to attach a bank card to the electronic card slot 20 (such that the control module 30 provides the SIM card function) and later to disconnect the bank card and connect a foreign SIM card to the electronic card slot 20. In such cases, the electronic device 100 needs to locate the correct functional block that is currently providing the SIM card function.

As a result, the storage module 35 of the control module 30 may have an instruction set stored therein, such that the control unit 34 that executes the instruction set is operable to obtain a status of one of the I/O ports that is associated with the identity verifying instruction. Furthermore, when the electronic card slot 20 is reset, the control unit 34 is operable to identify an identity verifying port among the electronic card slot 20 connected to the one of the I/O ports and the control module 30, for receiving the identity verifying instruction from the identity verifying port. In addition, the control unit 34 is operable to allow an executable JAVA Applet program stored in the control module 30 to access the output module, and to communicate with one of the I/O ports, in order to carry out the tasks described in steps S30 and S31.

In some examples, the electronic device 100 may be operable to communicate with a contact-less point of sale (POS) host and to receive a signal of a transaction therefrom via the antenna module 40 and the third I/O port 33. The signal of the transaction, for example, may include a promotional message of a particular commercial article. When it is determined that the signal of the transaction is received from the POS host, the control unit 34 that executes the least one executable program stored in the storage unit 35 is configured to process the signal of the transaction, and to generate a display screen according to the processed signal of the transaction. The display screen may include a hyperlink associated with the particular commercial article, and when the hyperlink is activated by the user (i.e., the user is interested in purchasing the particular commercial article) via a GUI or a SIM application toolkit (STK) menu displayed on the screen of the electronic device 100, the above mentioned method can be invoked for processing the impending transaction.

To sum up, the control module 30 that is implemented into the electronic device 100 is operable to serve the functionality of the SIM card, and to provide communication channels between the expansion slots of the electronic device 100 (i.e., the electronic card slot 20 and/or the SD card slot) and the functional blocks of the electronic device 100 (i.e., the baseband module 10, the storage unit 35, the user identification unit 36, etc.). With the Java card virtual machine architecture of the control module 30, Java-based programs (i.e., Java Applet programs) stored in the storage unit 35 are able to communicate with the electronic cards 200 inserted into the electronic card slot 20, and as a result, various types of the electronic cards 200 are rendered compatible to communicate with the electronic device 100 via the expansion slots that are coupled to the control module 30.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method of signal transmission to be implemented by a control module of an electronic device, the control module including a first input/output (I/O) port to be coupled to an input module, a second I/O port to be coupled to an output module, and a control unit, said method comprising the following steps of:

when a flag of an input signal received from the input module using the first I/O port conforms with a corresponding flag in the control module, configuring the control unit to electrically interconnect the first I/O port and the second I/O port such that the input module is able to communicate with the output module; and configuring the control unit to open a specific channel and to temporarily stop transmission within other channels when a multi-channel management instruction indicating the specific channel is received from the input module via the first I/O port.

2. The method as claimed in claim 1, further comprising the step of:

resetting the control unit upon receipt of a reset signal from the input module.

3. The method as claimed in claim 1, the control module further including a user identification unit coupled to the control unit, and a storage unit coupled to the control unit and having at least one executable program stored therein, wherein said method further comprises the following step of:

configuring the control unit to allow the user identification unit to communicate with the input module that is coupled to the first I/O port when the input signal received from the input module using the first I/O port includes an identity verifying instruction that is for verifying identity of a user of the electronic device.

4. The method as claimed in claim 3, wherein the identity verifying instruction includes at least one of a global system for mobile communications (GSM) instruction, a code division multiple access (CDMA) instruction, and a wideband code division multiple access (W-CDMA) instruction.

5. The method as claimed in claim 1, the control module further including a storage unit coupled to the control unit and having at least one executable program stored therein, said method further comprising the following step of:
configuring the control unit that executes the executable program to communicate with one of the input module and the output module via a corresponding one of the first and second I/O ports when the input signal received from the input module using the first I/O port includes a Java Applet instruction.

6. The method as claimed in claim 1, further comprising the following step of:
configuring the control unit to notify one of the input module and the output module via one of the first and second I/O ports when the input signal received from the input module is one that cannot be processed by the control unit.

7. The method as claimed in claim 1, wherein the control module includes a storage module that has an instruction set stored therein, such that the control unit that executes the instruction set is operable to:
obtain a status of one of the I/O ports that is associated with an identity verifying instruction that is for verifying identity of a user of the electronic device;
when the output module is reset, identify an identity verifying port among the output module connected to the one of the I/O ports and the control module, for receiving the identity verifying instruction from the identity verifying port; and
allow an executable JAVA Applet program stored in the control module to access the output module, and to communicate with one of the I/O ports.

8. The method as claimed in claim 1, the electronic device being operable to communicate with a contact-less point of sale (POS) host and to receive the input signal therefrom via an antenna module connected through a third I/O port, the control module further including a storage unit coupled to the control unit and having at least one executable program stored therein, said method further comprising the following step of:
when it is determined that the input signal is received from the POS host, configuring the control unit that executes the least one executable program to process the input signal, to store the processed input signal in the storage unit, and to generate a display screen according to the processed input signal.

9. An electronic device comprising:
an input module for receiving signals;
an output module; and
a control module including
first and second input/output (I/O) ports coupled to said input module and said output module,
a control unit coupled to said first and second I/O ports, and
a storage unit coupled to said control unit and having at least one executable program stored therein,
wherein said control unit is configured to electrically interconnect said first I/O port and said second I/O port such that said input module is able to communicate with said output module, when a flag of an input signal received from said input module using said first I/O port conforms with a corresponding flag in said at least one executable program, and
wherein said control unit is further configured to open a specific channel and to temporarily stop transmission within other channels when a multi-channel management instruction indicating the specific channel is received from said input module via said first I/O port.

10. The electronic device as claimed in claim 9, wherein said control module further includes a user identification unit that is coupled to said control unit,
wherein said control unit is further configured to allow said user identification unit to communicate with said input module using said first I/O port when said input signal received from said input module using said first I/O port includes an identity verifying instruction.

11. The electronic device as claimed in claim 10, wherein the identity verifying instruction includes at least one of a global system for mobile communications (GSM) instruction, a code division multiple access (CDMA) instruction, and a wideband code division multiple access (W-CDMA) instruction.

12. The electronic device as claimed in claim 9, wherein said control unit that executes said at least one executable program is further configured to communicate with one of said input module and said output module via a corresponding one of said first and second I/O ports when the input signal received from said input module using said first I/O port includes a Java Applet instruction.

13. The electronic device as claimed in claim 9, wherein said control unit is further configured to notify said input module via said first I/O port when said input signal received from said input module is one that cannot be processed by said control unit.

14. The electronic device as claimed in claim 9, wherein:
said input module includes a baseband module;
said control module further includes a third I/O port coupled to said control unit; and
said electronic device further comprises an antenna module coupled to said third I/O port.

15. The electronic device as claimed in claim 14, wherein said electronic device further comprises a wireless transmission module that is coupled to said baseband module and that electrically interconnects said antenna module and said third I/O port.

16. The electronic device as claimed in claim 14, wherein said control module further includes a user identification unit that is coupled to said control unit,
wherein said control unit is further configured to allow said user identification unit to communicate with said input module using said first I/O port when said input signal received from said input module using said first I/O port includes an identity verifying instruction.

17. The electronic device as claimed in claim 16, wherein said third I/O port is configured to enable communication with one of said user identification unit and said control unit that executes said at least one executable program stored in said storage unit therethrough.

18. The electronic device as claimed in claim 9, wherein said output module includes a power pin, a reset pin, a clock pin, a ground pin, an internal programming voltage pin, and a signal I/O pin.

19. The electronic device as claimed in claim 9, wherein said control module is an integrated circuit (IC) application chip having a Java card-based design, and said at least one executable program is a Java Applet program.

20. The electronic device as claimed in claim 9, wherein said control module and said input module are implemented onto a single integrated circuit chip.

21. The electronic device as claimed in claim 9, wherein said output module is one of an electronic card, an electronic card slot to be connected electrically to an electronic card, and a device that supports International Organization for Standardization (ISO) 7816 specification.

22. The electronic device as claimed in claim 9, wherein said input module is one of a baseband module, an antenna module and a device that supports ISO 7816/Universal Asynchronous Receiver/Transmitter (UART) specification.

23. The electronic device as claimed in claim 9, wherein said control module includes a storage unit that has an instruction set stored therein, such that said control unit that executes said instruction set is operable to:
- obtain a status of one of said I/O ports that is associated with an identity verifying instruction that is for verifying identity of a user of the electronic device;
- when said output module is reset, identify an identity verifying port among said output module connected to the one of said I/O ports and said control module, for receiving the identity verifying instruction from the identity verifying port; and
- allow an executable JAVA Applet program stored in said control module to access said output module, and to communicate with one of said I/O ports.

* * * * *